Patented Oct. 30, 1945

2,387,988

UNITED STATES PATENT OFFICE 2,387,988

NITRATION PRODUCTS OF MONOAZO DYESTUFFS

Friedrich Felix, Basel, Switzerland, and Werner Zürcher, deceased, late of Basel, Switzerland, by Josef Zürcher, administrator, Horgen, Switzerland, assignors to Society of Chemical Industry in Basle, Basel, Switzerland, a Swiss firm No Drawing. Application August 2, 1943, Serial No. 497,094. In Switzerland January 5, 1939

7 Claims. (Cl. 260—205)

This application is a continuation in part of our application Serial No. 312,618, filed January 5, 1940.

It has been found that new azo dyestuffs are obtained when monoazo dyestuffs of the general formula:

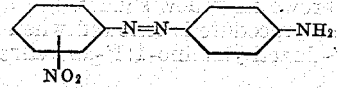

in which $R_1$ and $R_2$ represent aromatic nuclei of the benzene series, and $x$ and $y$ represent members of the group consisting of hydrogen and alkyl and substituted alkyl radicals, and in which moreover, the radical $R_1$ carries at least one nitro group, and in which the atomic grouping —N=N— stands in the para-position to the atomic grouping $$-N\begin{matrix}x\\ \\y\end{matrix}$$

are treated with nitrating agents.

Of particular interest are those dyestuffs which are obtained when azo dyestuffs of the formula:

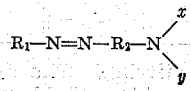

are treated with nitrating agents. Particularly good dyeing behaviour is manifested by those dyestuffs which are obtained by nitrating those nitroaminobenzenes in which the nitro group stands in the 4- or 3-position in relation to the azo group.

This process is thus concerned with the treatment of aminoazo dyestuffs with nitrating agents. Among the dyestuffs suited for the process may be mentioned products such as 4-nitro-4'-amino-1:1'-azobenzene, 4-nitro-4'-dialkylamino-1:1'-azobenzenes, such as, for example, 4-nitro-4'-dimethylamino-1:1'-azobenzene, 4-nitro-4'-diethylamino-1:1'-azobenzene, 4-nitro-4'-methylethylamino-1:1'-azobenzene, 4-nitro-4'-methylbutylamino-1:1'-azobenzene; further, 4-nitro-4'-amino-5'-methyl-1:1'-azobenzene, 4-nitro-4'-amino-5'-methoxy-1:1'-azobenzene, 3-nitro-4'-amino-1:1'-azobenzene, 3-nitro-4'-amino-5'-methyl-1:1'-azobenzene, 3-nitro-4'-amino-5'-methoxy-1:1'-azobenzene, 2-nitro-4'-amino-1:1'-azobenzene, 2-nitro-4'-amino-5'-methyl-1:1'-azobenzene, 4-nitro-4'-amino-6'-chloro-1:1'-azobenzene, etc.

Dyestuffs which also come under consideration are, for example 4-nitro-2-chloro-4'-amino-1:1'-azobenzene, 4-nitro-2-chloro-4'-dimethylamino-1:1'-azobenzene, 2:5-dichloro-4'-amino-1:1'-azobenzene, 2:5-dichloro-4'-dimethylamino-1:1'-azobenzene, 4-nitro-2:6-dichloro-4'-amino-1:1'-azobenzene, 4-nitro-2:6-dichloro-4'-dimethylamino-1:1'-azobenzene, 3-nitro-5-chloro-4'-amino-1:1'azobenzene, 2:4-dinitro-4'-amino-1:1'-azobenzene, 2:4-dinitro-6-chloro-4'-amino-1:1'-azobenzene.

These dyestuffs may be treated with nitrating agents according to the customary methods, for example, by means of concentrated or dilute nitric acid, particularly in the presence of sulphuric acid or other solvent as, for example, glacial acetic acid, acetic acid anhydride, chlorosulphonic acid, halogenated hydrocarbons or dioxane. Dyestuffs which contain primary or secondary amino groups may be nitrated as such, for example, in concentrated sulphuric acid; on the other hand, they may be previously acidylated in the amino group by treatment with acidylating agents, for example, by treating with acetic acid anhydride, and then subsequently subjected to the nitration. Similar products may also be obtained if these dyestuffs containing free amino groups are acidylated only after nitration. These dyestuffs are insoluble in water. They may find particular use in the dyeing of acetate rayon. The new dyestuffs form yellow to red powders and dye acetate rayon in shades of greenish yellow, yellow, orange and brown.

The new dyestuffs do not represent homogeneous products but are mixtures. However, it has been ascertained that these mixtures consist chiefly of azo-dyestuffs of the formula:

$$R_1-N=N-R_2-N\begin{matrix}x\\ \\y\end{matrix}$$

wherein $R_1$ and $R_2$ stand for nuclei of the benzene series and $x$ and $y$ stand for a member of the group consisting of hydrogen and alkyl radicals, wherein furthermore the radical $R_1$ contains at least one nitro group and the radical $R_2$ contains a nitro group, and wherein the atomic groupings —N=N— and

stand in para-position to one another. By the aforesaid property that the dyestuffs of the present invention are pronounced acetate rayon dyestuffs, they are clearly distinguished from a compound described by Hallmann in the year 1876 in "Berichte der deutschen Chemischen Gesellschaft," pages 390-391 (1876), which was later identified in "Beilstein's Handbuch der organischen Chemie," vol. 16, page 342, as a compound of the formula:

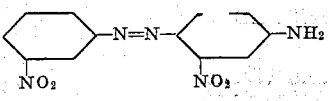

Applicants have, however, ascertained that this is an obvious error, and that it is apparently a question here of the compound of the formula:

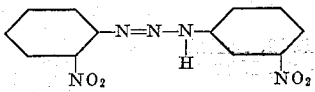

(however in very impure state). This constitution of the product has moreover already been previously confirmed by Meldola in said "Berichte," vol. 19 of 1886, pages 3243-3244.

Particularly valuable are the mixtures which consist mainly of the dyestuffs of the general formula:

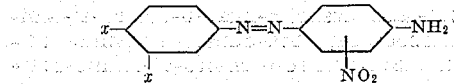

wherein one $x$ stands for a nitro group and the other $x$ stands for hydrogen.

The process permits among other things the manufacture of a series of amino azo dyestuffs of a new type, which may be used to dye acetate rayon, particularly for the dyeing of yellow shades. Over the amino azo dyestuffs dyeing in similar shades, the products possess the advantage of being non-phototropic and possessing good fastness to light at the same time, which is a property of particularly great interest where the preparation of grey and green combination shades is concerned.

Dyestuffs of this type which contain a free amino group may be treated either in substance, on the fibre, or on another substrate, whereby dyestuffs or dyeings possessing other properties may be obtained.

The following examples illustrate the invention, the parts, unless otherwise stated, being by weight.

*Example 1*

300 parts of sulphuric acid are cooled to 0° C., and 25 parts of 4-nitro-4'-amino-1:1'-azobenzene of the formula:

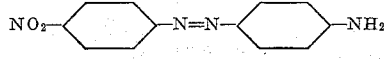

are added with stirring. The dyestuff dissolves in the sulphuric acid, probably with the formation of its sulphate, giving a yellow colour. A mixture containing 7 parts of concentrated sulphuric acid and 7 parts of concentrated nitric acid is now added, care being taken that the temperature is not allowed to rise above 0° C. The solution now changes to an orange-red colour. After stirring has been continued for half-an-hour, the solution is poured into ice water, and the dyestuff which separates is filtered off. By washing with water, if desired, by stirring with water and addition of an alkali, such as ammonia, the dyestuff suspension is exactly neutralized. In the dry state, the new dyestuff is a yellow-brown to brown-red powder which is insoluble in water, but which dyes acetate rayon in completely fast-to-light shades of reddish-yellow after it has been brought into a fine state of dispersion by treatment with Turkey-red oil or other soap-like dispersing agent, or with sulphite cellulose waste liquor. The new product represents a mixture of different products, the main constituent which determines the properties of the new dyestuff being a product of the formula:

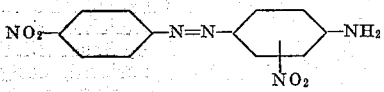

It dissolves in acetic acid ethylester to a yellow solution.

In a similar manner there is also treated the dyestuff of the formula:

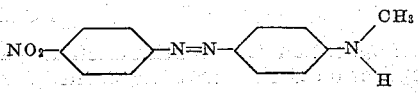

obtained by diazotizing 4-nitro-1-aminobenzene and coupling with N-methylaminobenzene.

*Example 2*

6.4 parts of 2-nitro-4'-amino-4-methyl-1:1'-azobenzene of the formula:

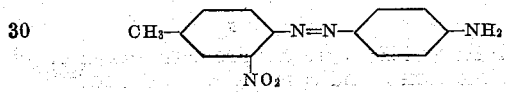

are dissolved in 75 parts by volume of concentrated sulphuric acid. 3.5 parts of a solution of 1.75 parts of nitric acid in 1.75 parts of sulphuric acid are dropped into this solution at a temperature of 0-5° C., and the temperature is then allowed to rise slowly to about 10° C. When the nitration is completed, the reaction mixture is poured into ice water, and the precipitated dyestuff is filtered off. It is then preferably stirred up with water and neutralized by addition of alkali. In the dry state the new dyestuff is a dark powder which, when converted into a high state of dispersion, is suitable for the dyeing of acetate rayon in brownish-yellow shades.

A similar procedure is followed when nitrating 2-nitro-4'-dimethylamino-1:1'-azobenzene of the formula:

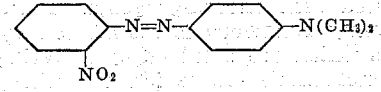

*Example 3*

150 parts by volume of concentrated sulphuric acid are cooled to 0° C., and 13.8 parts of 4-nitro-2-chloro-4'-amino-1:1'-azobenzene of the formula:

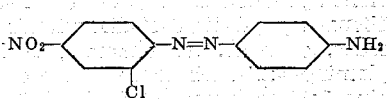

are dissolved therein. 7 parts by weight of a 50% solution of nitric acid in sulphuric acid are then slowly added, and the mixture is stirred for half-an-hour at about 10° C. After pouring the mixture into ice water, filtering and neutralizing, a dyestuff is obtained which forms a dark yellow powder in the dry state, and which dyes acetate rayon in yellow shades by the usual dyeing processes.

In a similar manner, 4-nitro-2:6-dichloro-4'-amino-1:1'-azobenzene can also be nitrated,

Example 4

12.1 parts of 3-nitro-4'-amino-1:1'-azobenzene of the formula:

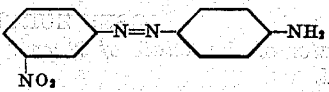

are dissolved at 0° C. in 150 parts by volume of sulphuric acid. Then, at about 10° C., a mixture consisting of 3.3 parts of nitric acid and 3.5 parts of sulphuric acid is added. Stirring is continued for some time at 10–20° C., and the solution is then poured into ice water, when the new dyestuff is precipitated. It is filtered off, washed and, if desired, freed from acid by neutralizing. In the dry state, it is a dark yellow to brown powder which is insoluble in water, but which dyes acetate rayon from a fine aqueous suspension in fast yellow shades by known methods.

The new product consists mainly of a product of the general formula:

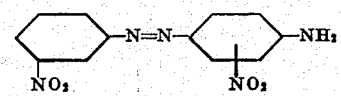

which determine also its property as an acetate rayon dyestuff.

A dyestuff possessing similar properties is obtained by the following procedure. 3-nitro-4'-amino-1:1'-azobenzene is acetylated by means of acetic acid anhydride. 15 parts of this acetyl compound are dissolved in 100 parts of glacial acetic acid at 50–60° C., and a solution consisting of 3.5 parts of nitric acid in about the same quantity of glacial acetic acid is added. The dyestuff may be isolated by removal of the glacial acetic acid by distillation, preferably under reduced pressure, and it may now be treated with saponifying agents in order to split off the acetyl radical.

Example 5

13.5 parts of 4-nitro-4'-dimethylamino-1:1'-azobenzene of the formula:

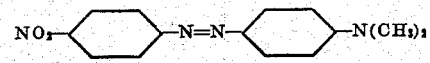

dissolved in 150 parts by volume of concentrated sulphuric acid at about 10° C., are treated with a solution consisting of 3.5 parts of nitric acid dissolved in about the same quantity of concentrated sulphuric acid. The reaction solution is poured into ice water, and the dyestuff is isolated by filtration and neutralization. In the dry state, it forms a dark brown powder, which dyes acetate rayon in brown tones.

This dyestuff may also be nitrated by treatment with nitrosyl chloride in an organic solvent, for example, in tetrachloroethane.

The nitration product prepared in this manner from 3-nitro-4'-dimethylamino-1:1' - azobenzene also dyes acetate rayon in brown tones.

What we claim is:

1. Process for the manufacture of azo-dyestuffs, comprising treating with nitrating agents mono-amino-monoazo-dyestuffs, which are free from sulpho groups, of the general formula $$R_1—N=N—R_2—N\begin{smallmatrix}x\\y\end{smallmatrix}$$

wherein $R_1$ and $R_2$ stand for nuclei of the benzene series, and $x$ and $y$ for a member of the group consisting of H and alkyl radicals, wherein furthermore the radical $R_1$ contains at least once a nitro group, and wherein the atomic groupings —N=N— and

stand in para position to one another.

2. Process for the manufacture of azo-dyestuffs, comprising treating with nitrating agents mono-amino-monoazo-dyestuffs, which are free from sulpho groups, of the general formula $$R_1—N=N—R_2—NH_2$$

wherein $R_1$ and $R_2$ stand for nuclei of the benzene series, wherein furthermore the radical $R_1$ contains at least once a nitro group, and wherein the atomic groupings —N=N— and —$NH_2$ stand in para position to one another.

3. Process for the manufacture of azo-dyestuffs, comprising treating with nitrating agents the monoazo-dyestuff of the formula

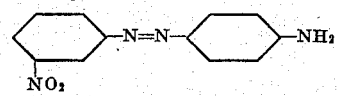

4. Process for the manufacture of azo-dyestuffs, comprising treating with nitrating agents the monoazo-dyestuff of the formula

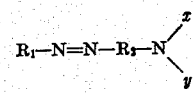

5. A composition of matter consisting of the nitration products of the dyestuffs of the general formula

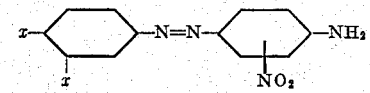

in which one $x$ stands for a nitro group and the other $x$ stands for a hydrogen atom, which nitration products are mixtures containing mainly products of the general formula:

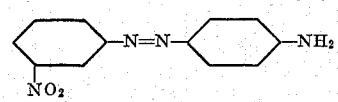

in which the two $x$'s have the aforesaid significance, and, when dry, are yellow to brown powders insoluble in water, but dissolving in acetic acid ethylester to yellow solutions and dyeing acetate rayon from fine aqueous suspensions intensive yellow shades.

6. A composition of matter consisting of the nitration product of the dyestuff of the formula:

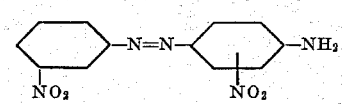

which is a mixture containing mainly a product of the formula:

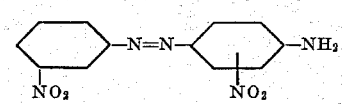

and, when dry, is a yellow to brown powder insoluble in water but dissolving in acetic acid ethylester to a yellow solution and dyeing acetate rayon from a fine aqueous suspension intensive yellow shades.

7. A composition of matter consisting of the nitration product of the dyestuff of the formula:

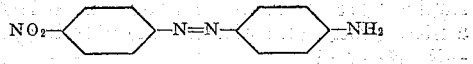

which is a mixture containing mainly a product of the formula:

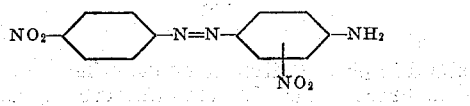

and, when dry, is a yellow to brown powder insoluble in water but dissolving in acetic acid ethylester to a yellow solution and dyeing acetate rayon from a fine aqueous suspension intensive yellow shades.

FRIEDRICH FELIX.
JOSEF ZÜRCHER.
*Administrator of the Estate of Werner Zürcher, Deceased.*